(12) United States Patent
Yoshida et al.

(10) Patent No.: US 10,496,459 B2
(45) Date of Patent: Dec. 3, 2019

(54) AUTOMATED SOFTWARE PROGRAM REPAIR CANDIDATE SELECTION

(71) Applicant: FUJITSU LIMITED, Kawasaki-shi, Kanagawa (JP)

(72) Inventors: Hiroaki Yoshida, Cupertino, CA (US); Mukul R. Prasad, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 111 days.

(21) Appl. No.: 15/822,106

(22) Filed: Nov. 24, 2017

(65) Prior Publication Data

US 2019/0163619 A1 May 30, 2019

(51) Int. Cl.
*G06F 11/07* (2006.01)
*G06F 11/36* (2006.01)

(52) U.S. Cl.
CPC ...... *G06F 11/0706* (2013.01); *G06F 11/0718* (2013.01); *G06F 11/3688* (2013.01)

(58) Field of Classification Search
CPC ............ G06F 11/0706; G06F 11/0718; G06F 11/3688; G06F 11/3692
USPC ....................................... 714/38.1
See application file for complete search history.

(56) References Cited

U.S. PATENT DOCUMENTS

| | | | | |
|---|---|---|---|---|
| 8,296,605 B2* | 10/2012 | John | ................... | G06F 11/0748 714/25 |
| 8,578,213 B2* | 11/2013 | Han | ................... | G06F 11/3636 714/38.1 |
| 9,378,014 B2* | 6/2016 | Wilson | ...................... | G06F 8/43 |
| 9,852,041 B2* | 12/2017 | Baggott | .............. | G06F 11/3476 |
| 2017/0060735 A1 | 3/2017 | Yoshida et al. | | |
| 2018/0060224 A1* | 3/2018 | Shavro | ................ | G06F 11/3688 |

OTHER PUBLICATIONS

Repair Anti-patterns: Shin Hwei Tan, Hiroaki Yoshida, Mukul R. Prasad, and Abhik Roychoudhury, "Anti-patterns in search-based program repair," In Proceedings of the 2016 24th ACM SIGSOFT International Symposium on Foundations of Software Engineering (FSE 2016), pp. 727-738, 2016.
Prophet: Fan Long and Martin Rinard, "Automatic patch generation by learning correct code," In Proceedings of the 43rd Annual ACM SIGPLAN-SIGACT Symposium on Principles of Programming Languages (POPL '16), pp. 298-312, 2016.

(Continued)

*Primary Examiner* — Joseph R Kudirka
(74) *Attorney, Agent, or Firm* — Maschoff Brennan

(57) ABSTRACT

According to an aspect of an embodiment, a method may identifying a fault location of a fault in a tested software program using a test suite and obtaining a repair candidate for the fault. In addition, the method may include obtaining a repair code pattern of the repair candidate and determining a number of occurrences of the repair code pattern in existing code of multiple existing software programs. Moreover, the method may include prioritizing the repair candidate as a repair of the tested software program based on the number of occurrences of the repair code pattern. The method may also include performing repair operations on the tested software program according to the prioritizing of the repair candidate.

20 Claims, 5 Drawing Sheets

(56) References Cited

OTHER PUBLICATIONS

Genesis: Fan Long, Peter Amidon, and Martin Rinard, "Automatic inference of code transforms for patch generation," In Proceedings of the 2017 11th Joint Meeting on Foundations of Software Engineering (ESEC/FSE 2017), pp. 727-739, 2017.

Abram Hindle, Earl T. Barr, Zhendong Su, Mark Gabel, and Premkumar Devanbu, "On the naturalness of software," In Proceedings of the 34th International Conference on Software Engineering (ICSE '12), pp. 837-847, 2012.

Baishakhi Ray, Vincent Hellendoom, Saheel Godhane, Zhaopeng Tu, Alberto Bacchelli, and Premkumar Devanbu, "On the "naturalness" of buggy code," In Proceedings of the 38th International Conference on Software Engineering (ICSE '16), pp. 428-439, 2016.

PR-Miner: Zhenmin Li and Yuanyuan Zhou, "PR-Miner: automatically extracting implicit programming rules and detecting violations in large software code," In Proceedings of the 10th European software engineering conference held jointly with 13th ACM SIGSOFT international symposium on Foundations of software engineering (ESEC/FSE-13), pp. 306-315, 2005.

\* cited by examiner

AUTOMATED SOFTWARE PROGRAM REPAIR CANDIDATE SELECTION

FIELD

The embodiments discussed in the present disclosure are related to automated software program repair candidate selection.

BACKGROUND

Software programs often have faults in them (commonly referred to as "bugs") in which they may not operate as intended. Often automated repair systems are used in attempt to identify and correct faults in software programs.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a method may identifying a fault location of a fault in a tested software program using a test suite and obtaining a repair candidate for the fault. In addition, the method may include obtaining a repair code pattern of the repair candidate and determining a number of occurrences of the repair code pattern in existing code of multiple existing software programs. Moreover, the method may include prioritizing the repair candidate as a repair of the tested software program based on the number of occurrences of the repair code pattern. The method may also include performing repair operations on the tested software program according to the prioritizing of the repair candidate.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
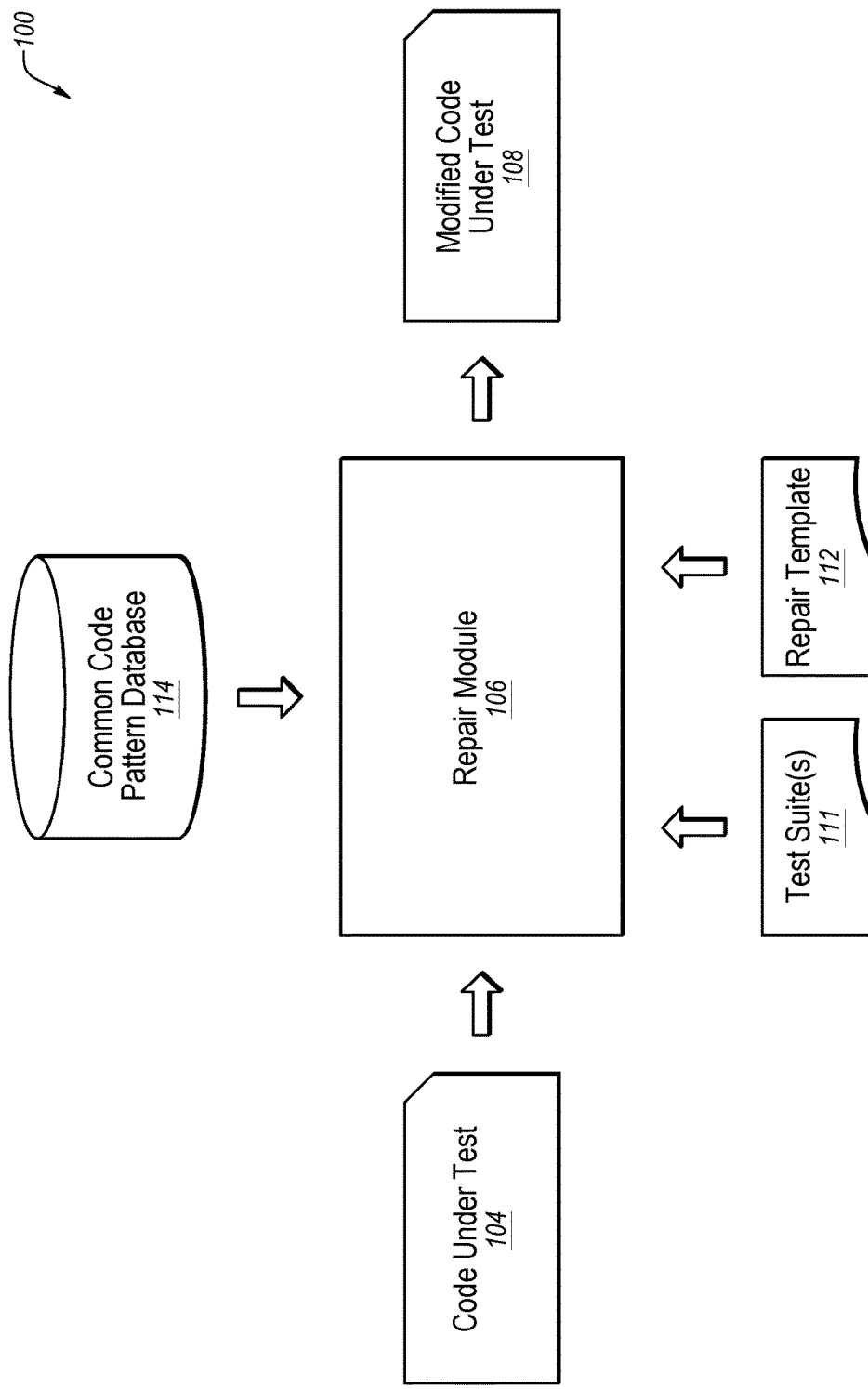
FIG. 1 is a diagram representing an example environment related to repairing a software program.

Some embodiments described in the present disclosure relate to methods and systems of repairing software programs. Software programs often include faults (also commonly referred to as "bugs") that may cause the software programs to behave in an unintended manner. Additionally, automated repair systems and techniques are often used to detect and correct faults to repair software programs. However, automated repair systems and techniques often do a poor job at selecting repairs to correct faults.

According to one or more embodiments of the present disclosure, repair candidates of a tested software program may be prioritized and selected to correct faults in the tested software program based on already existing code. For example, in some embodiments, one or more repositories of existing software programs may be accessed and patterns in the corresponding code may be obtained. In the present disclosure, the code patterns obtained from the existing software programs may be referred to as "common code patterns." Additionally, the repositories of existing software programs may include a large number of software programs (e.g., thousands, tens of thousands, hundreds of thousands, millions, etc. of software programs) such that it may be determined how often certain types of common code patterns may be used on a relatively large scale. In the present disclosure, software programs and their corresponding code that may be available for analysis such as in one or more repositories may be referred to as "big code."

In some embodiments of the present disclosure, the common code patterns and number of times each common code pattern is encountered in the analyzed big code may be stored in a common code pattern database. Additionally, in some embodiments, a particular code pattern of a particular repair candidate (referred to in the present disclosure as a "repair code pattern") may also be obtained. In these or other embodiments, the particular repair code pattern may be compared against the common code patterns included in the common code pattern database to determine how many times the particular repair code pattern may occur in the analyzed big code. Additionally, as discussed in detail below, the particular repair candidate may be prioritized as a repair of the tested software program based on the number of occurrences of the particular repair code pattern in the analyzed big code. In these or other embodiments, repair operations may be performed on the tested software program according to the prioritization of the particular repair candidate and/or of the prioritization of one or more other repair candidates. The analysis and prioritization of repair candidates as described may improve the efficiency of automated software program repair by selecting repair candidates with code patterns that are commonly used in existing software programs and thus are likely more effective than repair candidates that may not be as commonly used.

Embodiments of the present disclosure are explained with reference to the accompanying drawings.

FIG. 1 is a diagram representing an example environment 100 related to repairing a software program, arranged in accordance with at least one embodiment described in the present disclosure. The environment 100 may include a repair module 106 configured to analyze code under test 104 for faults. The repair module 106 may also be configured to output modified code under test 108, which may include one or more modifications made to the code under test 104 by repair operations performed by the repair module 106.

The code under test 104 may include electronic data, such as, for example, the software program, code of the software program, libraries, applications, scripts, or other logic or instructions for execution by a processing device. In some embodiments, the code under test 104 may include a complete instance of the software program. Additionally or alternatively, the code under test 104 may include a portion of the software program. The code under test 104 may be written in any suitable type of computer language that may be used for the software program.

The repair module 106 may include code and routines configured to enable a computing device to perform one or more modifications of the code under test 104 to generate the modified code under test 108. Additionally or alternatively, the repair module 106 may be implemented using hardware including a processor, a microprocessor (e.g., to perform or control performance of one or more operations), a field-programmable gate array (FPGA), or an application-specific integrated circuit (ASIC). In some other instances, the repair module 106 may be implemented using a combination of hardware and software. In the present disclosure, operations described as being performed by the repair module 106 may include operations that the repair module 106 may direct a corresponding system to perform.

The repair module 106 may be configured to perform a series of repair operations with respect to the code under test 104 that may be used to repair (also referred to as correct) one or more faults in the code under test 104. In some embodiments, the repair module 106 may be configured to perform one or more of the repair operations based on a repair template 112 and one or more test suites 111.

The repair template 112 may include any suitable type of instructions or routines that, when executed, may be configured to implement one or more modifications with respect to the code under test 104 in response to the presence of faults in the code under test 104. The modifications may include changes in the code under test 104 that may repair or attempt to repair the faults. In the present disclosure, the modifications that may be performed may be referred to as "repair candidates" or "repairs."

The test suites 111 may include one or more routines that may act as test cases for the code under test 104. The test suites 111 may be configured to determine whether the code under test 104 behaves in a specified manner. The test suites 111 may be configured according to any suitable technique.

The repair module 106 may be configured to apply one or more of the test suites 111 with respect to the code under test 104 to detect or determine one or more faults and corresponding fault locations in the code under test 104. In some embodiments, the repair module 106 may be configured to execute one or more tests included in the test suites 111, which may be referred to as performing a test execution. A test execution that passes may be referred to as a "passing test execution" and a test execution that fails may be referred to as a "failing test execution." In some embodiments, a fault location and corresponding fault of the code under test 104 may be identified based on a failing test execution executing code appearing at the fault location.

In some embodiments, the repair module 106 may be configured to obtain a repair candidate from the repair template as a potential modification that may be made to repair a detected fault. In these or other embodiments, the repair module 106 may be configured to normalize the code of the repair candidate. In the present disclosure, the code of the repair candidate may be referred to as "repair code." Additionally or alternatively, in some embodiments, a portion of the repair code may be normalized or all of the repair code may be normalized.

In some embodiments, the repair code may be normalized according to one or more operations described below with respect to FIG. 5.

In some embodiments, the repair module 106 may obtain a repair code pattern based on the normalized repair code. For example, in some embodiments, the normalized repair code may be used as a repair code pattern. Additionally or alternatively, a hashing function may be applied to the normalized repair code to obtain a hash value that may indicate a particular pattern of the repair code. In these or other embodiments, the obtained hash value may be used as the repair code pattern.

In some embodiments, the repair module 106 may be configured to access a common code pattern database 114. The common code pattern database 114 may include common code patterns that may be derived from big code. For example, the common code patterns may be derived from existing code of existing software programs that may be stored in one or more repositories of existing software programs. Additionally, in some embodiments, the common code pattern database 114 may include an entry counter value stored with each of the common code patterns. The entry counter value may indicate a number of occurrences of its corresponding common code pattern that may be found during the analysis of the big code that may be performed to obtain the common code patterns.

In some embodiments, the common code patterns may be based on normalized portions of the existing code of the existing software programs. The normalization may be such that parameters that may be specific to the repair code and the common code but that may also have general patterns and structure may be normalized into generic forms that reflect the general patterns and structure. The normalization may thus allow for the comparison of code patterns of different code.

In some embodiments, the portions of the existing code may be normalized according to one or more operations described below with respect to FIG. 5.

In some embodiments, the common code patterns may be based on the normalized existing code. For example, in some embodiments, the normalized existing code that corresponds to a particular portion may be used as a particular common code pattern. Additionally or alternatively, a hashing function may be applied to the normalized existing code to obtain a hash value that may indicate a particular pattern of the corresponding portion of the existing code. In these or other embodiments, the obtained hash value may be used as the corresponding common code pattern. In some embodiments, the common code patterns and the occurrences of the common code patterns included in the common code pattern database 114 may be obtained according to one or more operations described below with respect to FIGS. 4 and 5.

The repair module 106 may be configured to compare the repair code pattern of the repair candidate with the common code patterns included in the common code pattern database 114 to determine how many times the particular repair code pattern may occur in the analyzed big code. For example, in some embodiments, the repair module 106 may determine whether or not the repair code pattern matches one of the common code patterns included in the common code pattern database 114. In response to determining that the repair code pattern matches a particular common code pattern, the repair module 106 may be configured to obtain the entry counter value related to the number of occurrences of the particular common code pattern that may be stored in the common code pattern database 114 in conjunction with the particular common code pattern. The obtained value may thus indicate a number of occurrences of the repair code pattern in the big code and may thus indicate how commonly code with a same code pattern as the repair candidate may be used in big code. Additionally or alternatively, in response to determining that the repair code pattern does not match a particular common code pattern, the repair module 106 may be configured to use "0" as the number of occurrences of the repair candidate code pattern.

In some embodiments, the repair module 106 may be configured to prioritize the repair candidate as a repair of the fault based on the determined number of occurrences of the repair code pattern. For example, in some embodiments, multiple repair candidates may be analyzed as described above to determine a number of occurrences of each corresponding repair code pattern may be found in the analyzed big data. The multiple repair candidates may be prioritized based on the number of occurrences in which the repair candidates with more occurrences are prioritized over repair candidates with fewer occurrences. Additionally or alternatively, in some embodiments, repair candidates with determined occurrences that are below a certain threshold number may be removed from consideration altogether as a potential repair.

In some embodiments, the occurrence threshold may be based on: (1) the number of software programs in the big code analyzed for common code patterns; (2) the number of different common code patterns identified in the analysis of the big code; and (3) the total number of occurrences of all common code patterns identified in the analyzed big code. For example, the average number of occurrences of patterns may be calculated by dividing the total number of occurrences of all common code patterns by the number of different common code patterns ("Factor (3)/Factor (2)." In some embodiments, the occurrence threshold may be set as a relatively-small number compared to the average, e.g. 1%, 2%, 5%, 10%, etc. of the average. For instance, in instances in which the average number of occurrences is 300 and the threshold is based on 1% of the average, the occurrence threshold may be set 3

In some embodiments, the repair module 106 may also be configured to perform repairs on the code under test 104 based on the prioritization of the repair candidates. For example, the repair module 106 may implement as potential repairs, the repair candidates in descending order from highest prioritization to lowest prioritization. Additionally or alternatively, the repair module 106 may be configured to output the modified code under test 108, which may include one or more repairs that may be implemented based on the prioritization of the repair candidates.

Modifications, additions, or omissions may be made to FIG. 1 without departing from the scope of the present disclosure. For example, the environment 100 may include more or fewer elements than those illustrated and described in the present disclosure. In addition, in some embodiments, one or more routines, one or more instructions, or at least a portion of code of the repair module 106, the test suites 111, and the repair template 112 may be combined such that they may be considered the same element or may have common sections that may be considered part of two or more of the repair module 106, the test suites 111, and the repair template 112.

Figure 2:
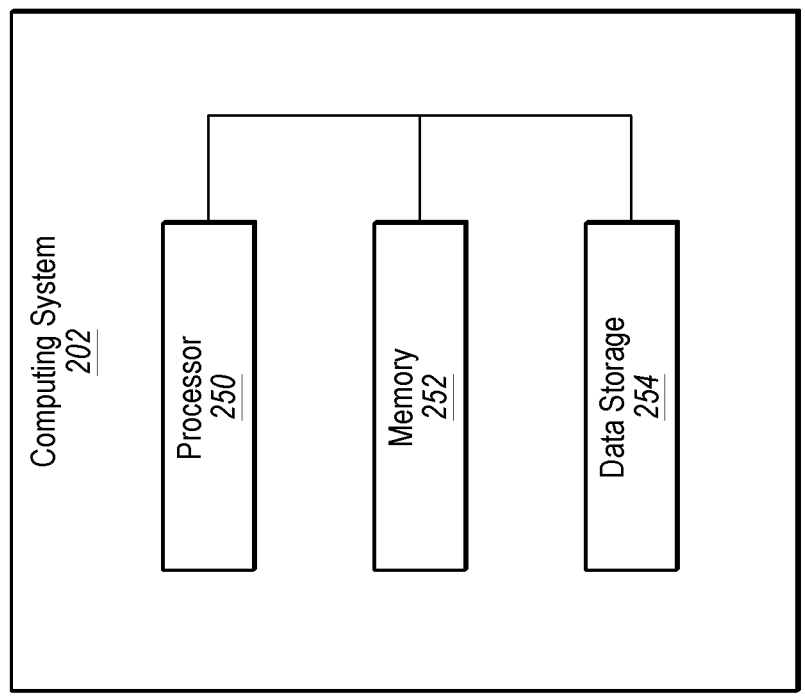
FIG. 2 illustrates an example computing system that may be configured to repair a software program.

FIG. 2 illustrates a block diagram of an example computing system 202, according to at least one embodiment of the present disclosure. The computing system 202 may be configured to implement or direct one or more operations associated with a repair module (e.g., the repair module 106). The computing system 202 may include a processor 250, a memory 252, and a data storage 254. The processor 250, the memory 252, and the data storage 254 may be communicatively coupled.

In general, the processor 250 may include any suitable special-purpose or general-purpose computer, computing entity, or processing device including various computer hardware or software modules and may be configured to execute instructions stored on any applicable computer-readable storage media. For example, the processor 250 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 2, the processor 250 may include any number of processors configured to, individually or collectively, perform or direct performance of any number of operations described in the present disclosure. Additionally, one or more of the processors may be present on one or more different electronic devices, such as different servers.

In some embodiments, the processor 250 may be configured to interpret and/or execute program instructions and/or process data stored in the memory 252, the data storage 254, or the memory 252 and the data storage 254. In some embodiments, the processor 250 may fetch program instructions from the data storage 254 and load the program instructions in the memory 252. After the program instructions are loaded into memory 252, the processor 250 may execute the program instructions.

For example, in some embodiments, the repair module may be included in the data storage 254 as program instructions. The processor 250 may fetch the program instructions of the repair module from the data storage 254 and may load the program instructions of the repair module in the memory 252. After the program instructions of the repair module are loaded into memory 252, the processor 250 may execute the program instructions such that the computing system may implement the operations associated with the repair module as directed by the instructions.

The memory 252 and the data storage 254 may include computer-readable storage media for carrying or having computer-executable instructions or data structures stored thereon. Such computer-readable storage media may include any available media that may be accessed by a general-purpose or special-purpose computer, such as the processor 250. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 250 to perform a certain operation or group of operations.

Modifications, additions, or omissions may be made to the computing system 202 without departing from the scope of the present disclosure. For example, in some embodiments, the computing system 202 may include any number of other components that may not be explicitly illustrated or described.

Figure 3:
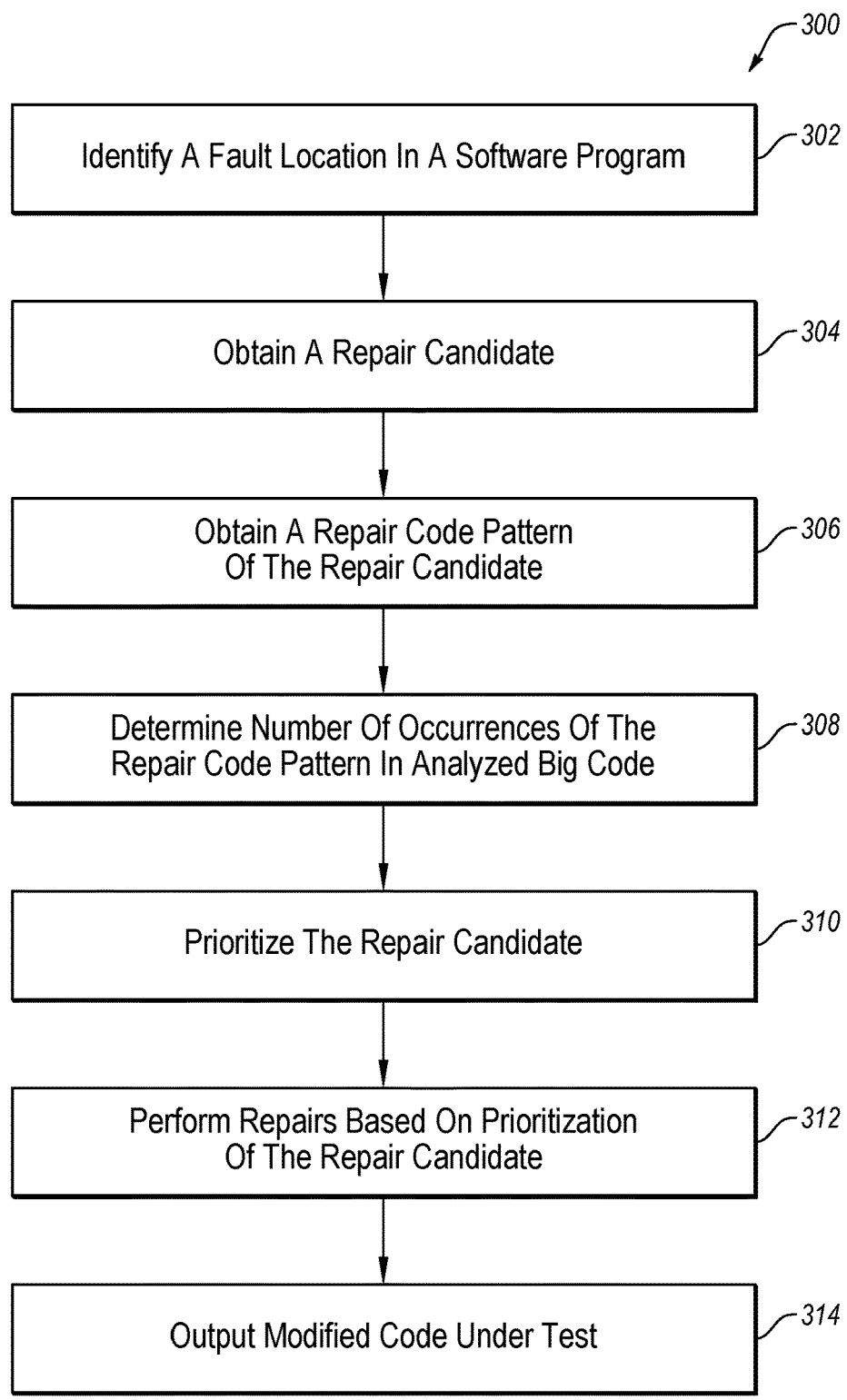
FIG. 3 is a flowchart of an example method of repairing a software program.

FIG. 3 is a flowchart of an example method 300 of repairing a software program, according to at least one embodiment described in the present disclosure. The method 300 may be performed by any suitable system, apparatus, or device with respect to code under test. For example, the repair module 106 of FIG. 1 or the computing system 202 of FIG. 2 (e.g., as directed by a repair module) may perform one or more of the operations associated with the method 300 with respect to the code under test 104. Although illustrated with discrete blocks, the steps and operations associated with one or more of the blocks of the method 300 may be divided into additional blocks, combined into fewer blocks, or eliminated, depending on the particular implementation.

The method 300 may begin at block 302, where a fault and its corresponding fault location may be identified in the code under test. The fault identification may be performed with respect to the code under test using any suitable technique. For example, in some embodiments, the fault identification may be performed based on performing a test execution of the one or more test suites with respect to the code under test.

At block 304, a repair candidate may be obtained. In some embodiments, the repair candidate may be obtained based on a repair template such as described above.

At block 306, a repair code pattern of the repair candidate may be obtained. In some embodiments, the repair code pattern may be obtained according to one or more operations described below with respect to FIG. 5.

At block 308, a number of occurrences of the repair code pattern in previously analyzed big code may be determined. For example, the number of occurrences may be determined based on information included in a common code pattern database such as described above with respect to FIG. 1.

At block 310, a prioritization may be determined for the repair candidate based on the determined number of occurrences in the analyzed big code. In some embodiments, the prioritization may be similar or the same as that described above with respect to FIG. 1.

At block 312, repairs may be performed based on the prioritization of the repair candidate that may be determined at block 314. For example, in some embodiments, when the prioritization indicates that the repair candidate is deemed to be acceptable based on the comparison between the determined number of occurrences and the occurrence threshold value, the repair candidate may be accepted and implemented at block 312. Conversely, when the prioritization indicates that the repair candidate is deemed to be unacceptable based on the comparison between its determined number of occurrences and the occurrence threshold value, the repair candidate may be rejected and another repair candidate may be selected.

In these or other embodiments, multiple repair candidates that may correspond to the fault location may be prioritized based on blocks 304, 306, 308, and 310. At block 312, the repair candidate of the multiple repair candidates that has the highest priority may be implemented.

At block 318, modified code under test may be output. The modified code under test may include modifications that may include one or more repair candidates that may be implemented based on the repair prioritization described above such that the modified code under test may include a repaired version of the code under test that may be received at block 302.

The method 300 may improve the efficiency and efficacy of software program testing and repair. For example, the determining of the prioritization of repair candidates as described help make better determinations as to the effectiveness of repair candidates.

Modifications, additions, or omissions may be made to the method 300 without departing from the scope of the present disclosure. For example, the operations of method 300 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

For example, in some embodiments, the method 300 may be performed iteratively in which a single fault location and a single repair candidate that corresponds to the fault location may be analyzed at a time. Additionally or alternatively, one or more operations associated with one or more blocks may be performed with respect to multiple fault locations or multiple repair candidates at a time.

Figure 4:
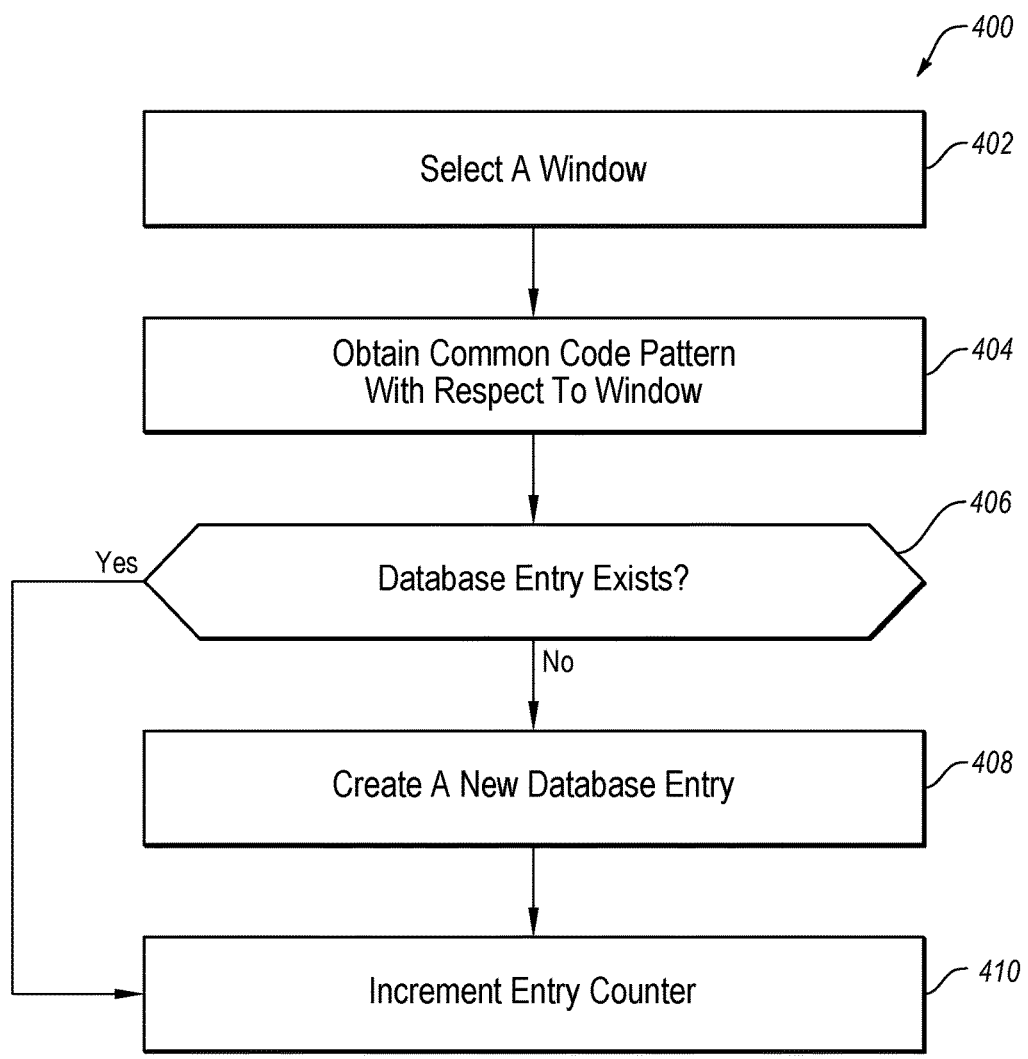
FIG. 4 is a flowchart of an example method of populating a common code pattern database.

FIG. 4 is a flowchart of an example method 400 of populating a common code pattern database, according to at least one embodiment described in the present disclosure. The method 400 may be performed by any suitable system, apparatus, or device with respect to software code. For example, the repair module 106 of FIG. 1 or the computing system 202 of FIG. 2 (e.g., as directed by a repair module) may perform one or more of the operations associated with the method 400 with respect to existing code of an existing software program that may be part of big code. Although illustrated with discrete blocks, the steps and operations associated with one or more of the blocks of the method 400 may be divided into additional blocks, combined into fewer blocks, or eliminated, depending on the particular implementation.

The method 400 may begin at block 402, where a window of an existing software program that may be part of big code may be selected. The window may include one or more lines of existing code of the existing software program. In some embodiments, the size of the window (e.g., the number of lines) may be based on specific design or implementation considerations. For example, larger window sizes may result in higher quality determinations with respect to code patterns, but may also introduce larger computation times.

Additionally or alternatively, in some embodiments, the window may be selected based on a previous window selection with respect to the existing software program. For example, in instances in which the existing software program has not been analyzed yet, the window may include the first lines of code of the existing software program because no previous window selection may be performed. Additionally or alternatively, in instances in which a previous window has been analyzed, the selected window may include the next lines of code. For example, the windows may include 5 lines of code and the previous window may have included lines 5-10 of the existing code. The window selected at block 402 in this example may then include lines 11-15 of the existing code.

At block 404, a common code pattern of the existing code within the window may be obtained. In some embodiments, the common code pattern may be obtained according to one or more operations described below with respect to FIG. 5.

At block 406, it may be determined whether the common code pattern database includes the common code pattern obtained at block 404. In response to the common code pattern database not including the common code pattern, the method 400 may proceed to block 408. In contrast, in response to the common code pattern database including the common code pattern, the method 400 may proceed to block 410.

At block 408, a new database entry may be created for the common code pattern. In some embodiments, the new database entry may include the common code pattern. In these or other embodiments, an entry counter with a value that indicates the number of occurrences of the common code pattern may also be created and given a value of "0". Following block 408, the method 400 may proceed to block 410.

At block 410, the entry counter value may be incremented. For example, in response to proceeding from block 408, the entry counter value may be incremented to "1." As another example, in response to proceeding from block 406, the entry counter value may be "n" prior to proceeding from block 406 to block 410 and may be incremented to "n+1."

Accordingly, the common code pattern database may be populated with information related to a common code pattern that may correspond to a window of existing code of big code. In some instances, the method 400 may be repeated for any number of windows of existing code and for any number of software programs.

Modifications, additions, or omissions may be made to the method 400 without departing from the scope of the present disclosure. For example, the operations of method 400 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

For example, in some embodiments, the method 400 may be performed iteratively in which a single window of existing code may be analyzed at a time. Additionally or alternatively, one or more operations associated with one or more blocks may be performed with respect to multiple windows of existing code at a time.

Figure 5:
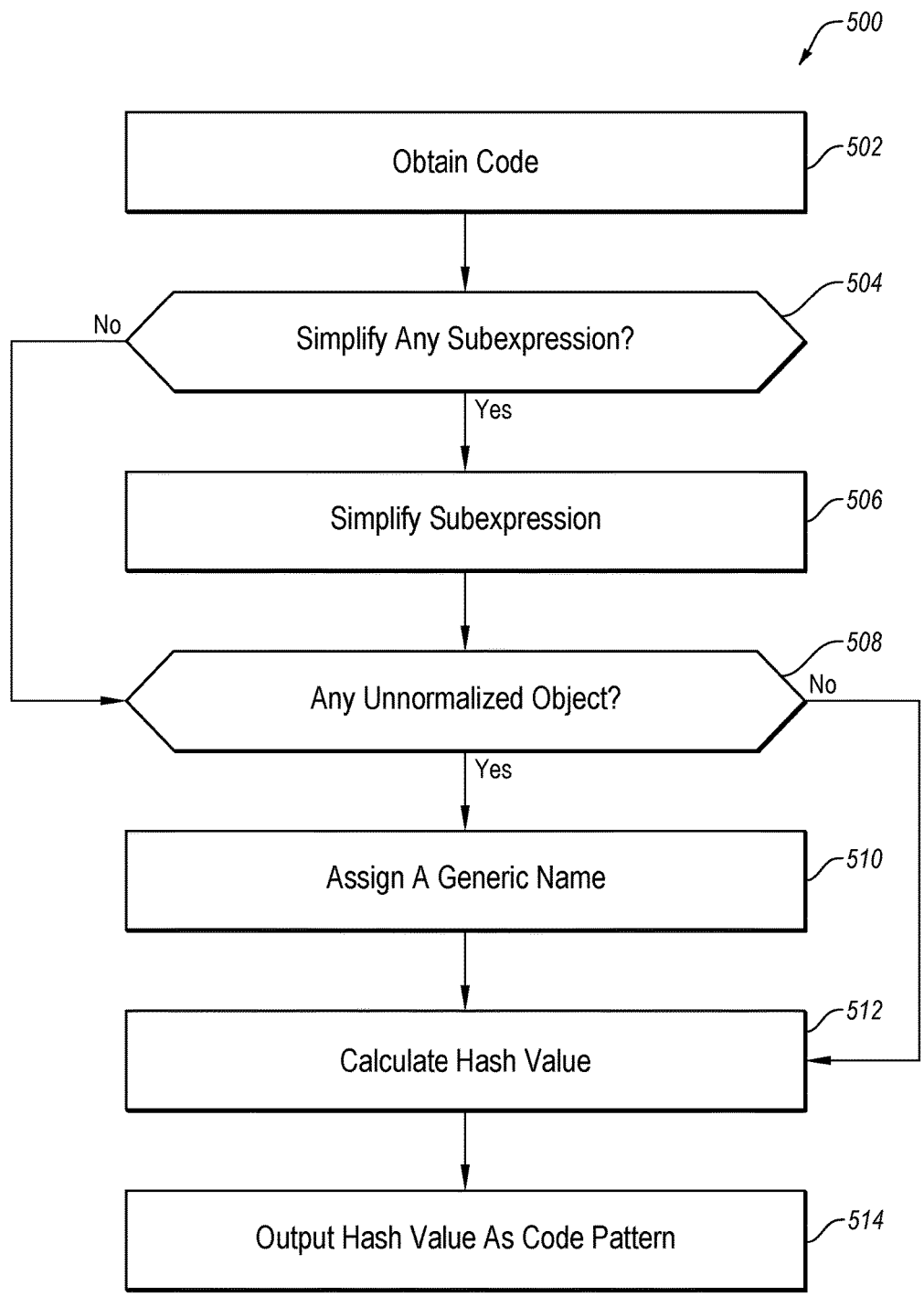
FIG. 5 is a flowchart of an example method of obtaining a code pattern.

FIG. 5 is a flowchart of an example method 500 of obtaining a code pattern, according to at least one embodiment described in the present disclosure. The method 500 may be performed by any suitable system, apparatus, or device with respect to software code. For example, the repair module 106 of FIG. 1 or the computing system 202 of FIG. 2 (e.g., as directed by a repair module) may perform one or more of the operations associated with the method 500 with respect to repair code of a repair candidate or with respect to existing code of a an existing software program. Although illustrated with discrete blocks, the steps and operations associated with one or more of the blocks of the method 500 may be divided into additional blocks, combined into fewer blocks, or eliminated, depending on the particular implementation.

The method 500 may begin at block 502, where code may be obtained. In some instances, the code may include existing code within a window of an existing software program such as described above with respect to FIG. 4. In other instances, the code may include repair code of a repair candidate. In these or other instances, the number of lines of the repair code that may be obtained may correspond to a size of a window that may be used to obtain common code patterns that may be compared against the repair code pattern that may be generated. For example, in some embodiments, the number of lines of the repair code that may be obtained may be the same size as the window used to obtain the common code patterns.

Blocks 504, 506, 508, and 510 of the method 500 relate to normalizing the code obtained at block 502. As indicated above, the normalization may be such that parameters that may be specific to the obtained code and corresponding software program but that may also have general patterns and structure may be normalized into generic forms that reflect the general patterns and structure. The normalization may allow for the comparison of code patterns of different code.

For example, in some embodiments, the method 500 may include block 504. At block 504, it may be determined whether to simplify any subexpressions of the obtained code. For example, in some instances, the code may include subexpressions that may have a particular type of structure, but that may also be more complex than needed to reflect the corresponding structure. As such, at block 504 a level of complexity may be determined for one or more subexpressions that may be included in the code. In some embodiments, the level of complexity may be determined for every subexpression that may be included in the code.

In some embodiments, the level of complexity may be determined for a particular subexpression based on a number of parameters (e.g., values, constants, variables, operators, and functions, etc.) that may be included in the particular subexpression. In these or other embodiments, the number of parameters may be compared against a complexity threshold value. In response to the number of parameters being greater than or equal to the complexity threshold value, it may be determine that the particular sub expression satisfies the complexity threshold value and is to be simplified. In contrast, in response to the number of parameters being less than the complexity threshold value, it may be determine that the particular subexpression does not satisfy the complexity threshold value and may thus not undergo any simplification.

In response to determining that there are not any subexpressions that are to be simplified, the method 500 may proceed from block 504 to block 508. In response to determining that there are one or more subexpressions are to be simplified, the method 500 may proceed from block 504 to block 506. At block 506, the subexpressions that are to be simplified may be simplified. In some embodiments, the applicable subexpressions may be simplified by an abstraction process that replaces complex expressions with simpler ones in which the replacement expression does not satisfy the complexity threshold value. In some embodiments, the replacement expression may include a generic form that may be used for all expressions of the same type such that the replacement expression may be normalized across different portions of code for which code patterns may be obtained. Following block 506, the method 500 may proceed to block 508.

At block 508, it may be determined whether any objects (e.g., values, constants, variables, and functions, etc.) included in the code obtained at block 502 are unnormalized. An unnormalized object may include an object of a certain type that may have a name or identifier given to it that is specific to the code and corresponding program software in which the naming convention used is not consistently followed.

In response to determining that there are not any objects that are unnormalized, the method 500 may proceed from block 508 to block 512. In response to determining that one or more objects are unnormalized, the method 500 may proceed from block 508 to block 510. At block 510, the unnormalized objects may be normalized. In some embodiments, the normalization of a particular unnormalized objects may include changing the particular object, which may be specifically labeled in an unconventional or inconsistent manner, into a generically labeled object that may be of the same type and that may be used for all objects of that type. For example, in instances in which the particular unnormalized object is an integer with a specific name or label, the object may be changed into an integer with a generic name or label that may be used for all integers. Following block 510, the method 500 may proceed to block 512.

At block 512, the code that may be normalized at blocks 504, 506, 508, and 510 may be obtained as normalized code. Additionally, at block 512, a hashing function may be applied to the normalized code to obtain a hash value that may correspond to the normalized portion. The hash value may indicate a code pattern that may correspond to the code obtained at block 502. For example, in some instances, a same hash value that corresponds to two different portions of code may indicate that the two different portions of code include a same code pattern. In some embodiments, at block 514, the hash value may be output as a code pattern of the code obtained at block 502.

Modifications, additions, or omissions may be made to the method 500 without departing from the scope of the present disclosure. For example, the operations of method 500 may be implemented in differing order. For instance, the operations related to normalizing the code may be performed in a different order than described or illustrated or may be performed concurrently.

Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments. For instance, in some embodiments, the operations related to calculating the hash function may be omitted. Additionally, in some embodiments, the method 500 may be performed iteratively in which a single window of existing code may be analyzed at a time. Additionally or alternatively, one or more operations associated with one or more blocks may be performed with respect to multiple windows of existing code at a time.

As indicated above, the embodiments described in the present disclosure may include the use of a special purpose or general purpose computer (e.g., the processor 250 of FIG. 2) including various computer hardware or software modules, as discussed in greater detail below. Further, as indicated above, embodiments described in the present disclosure may be implemented using computer-readable media (e.g., the memory 252 or data storage 254 of FIG. 2) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:
1. A method comprising:
   identifying a fault location of a fault in a tested software program using a test suite;
   obtaining a repair candidate for the fault;
   obtaining a repair code pattern of the repair candidate;

determining a number of occurrences of the repair code pattern in existing code of a plurality of existing software programs;

prioritizing the repair candidate as a repair of the tested software program based on the number of occurrences of the repair code pattern; and performing repair operations on the tested software program according to the prioritizing of the repair candidate.

2. The method of claim 1, further comprising:

obtaining a plurality of common code patterns from the existing code;

determining a number of occurrences of the plurality of common code patterns in the existing code; and determining the number of occurrences of the repair code pattern based on a determination that the repair code pattern matches a particular common code pattern of the plurality of common code patterns and based on a determined particular number of occurrences of the particular common code pattern.

3. The method of claim 2, wherein obtaining the particular common code pattern includes:

obtaining a portion of particular existing code of a particular existing software program;

normalizing the portion of the particular existing code; and basing the particular common code pattern on the normalized portion.

4. The method of claim 3, wherein normalizing the portion of the particular existing code includes changing a specifically labeled object of the portion into a generically labeled object, wherein the specifically labeled object and the generically labeled object are of a same object type.

5. The method of claim 3, wherein normalizing the portion of the particular existing code includes:

determining that a complexity level of an expression of the portion satisfies a complexity threshold; and simplifying the expression in response to determining that the complexity level satisfies the complexity threshold.

6. The method of claim 3, wherein basing the particular common code pattern on the normalized portion includes using the normalized portion as the particular common code pattern.

7. The method of claim 3, wherein basing the particular common code pattern on the normalized portion includes:

applying a hashing function to the normalized portion to obtain a hash value that corresponds to the normalized portion; and using the hash value as the particular common code pattern.

8. The method of claim 1, wherein obtaining the repair code pattern of the repair candidate includes:

normalizing repair code of the repair candidate; and basing the repair code pattern on the normalized repair code.

9. The method of claim 8, wherein basing the repair code pattern on the normalized repair code includes using the normalized repair code as the repair code pattern.

10. The method of claim 8, wherein basing the repair code pattern on the normalized repair code includes:

applying a hashing function to the normalized repair code to obtain a hash value that corresponds to the normalized repair code; and using the hash value as the repair code pattern.

11. Non-transitory computer-readable storage media configured to store instructions that, in response to being executed, cause a system to perform operations, the operations comprising:

identifying a fault location of a fault in a tested software program using a test suite;

obtaining a repair candidate for the fault;

obtaining a repair code pattern of the repair candidate;

determining a number of occurrences of the repair code pattern in existing code of a plurality of existing software programs;

prioritizing the repair candidate as a repair of the tested software program based on the number of occurrences of the repair code pattern; and performing repair operations on the tested software program according to the prioritizing of the repair candidate.

12. The computer-readable storage media of claim 11, wherein the operations further comprise:

obtaining a plurality of common code patterns from the existing code;

determining a number of occurrences of the plurality of common code patterns in the existing code; and determining the number of occurrences of the repair code pattern based on a determination that the repair code pattern matches a particular common code pattern of the plurality of common code patterns and based on a determined particular number of occurrences of the particular common code pattern.

13. The computer-readable storage media of claim 12, wherein obtaining the particular common code pattern includes:

obtaining a portion of particular existing code of a particular existing software program;

normalizing the portion of the particular existing code; and basing the particular common code pattern on the normalized portion.

14. The computer-readable storage media of claim 13, wherein normalizing the portion of the particular existing code includes changing a specifically labeled object of the portion into a generically labeled object, wherein the specifically labeled object and the generically labeled object are of a same object type.

15. The computer-readable storage media of claim 13, wherein normalizing the portion of the particular existing code includes:

determining that a complexity level of an expression of the portion satisfies a complexity threshold; and simplifying the expression in response to determining that the complexity level satisfies the complexity threshold.

16. The computer-readable storage media of claim 13, wherein basing the particular common code pattern on the normalized portion includes using the normalized portion as the particular common code pattern.

17. The computer-readable storage media of claim 13, wherein basing the particular common code pattern on the normalized portion includes:

applying a hashing function to the normalized portion to obtain a hash value that corresponds to the normalized portion; and using the hash value as the particular common code pattern.

18. The computer-readable storage media of claim 11, wherein obtaining the repair code pattern of the repair candidate includes:

normalizing repair code of the repair candidate; and basing the repair code pattern on the normalized repair code.

19. The computer-readable storage media of claim 18, wherein basing the repair code pattern on the normalized repair code includes using the normalized repair code as the repair code pattern.

20. The computer-readable storage media of claim 18, wherein basing the repair code pattern on the normalized repair code includes:
   applying a hashing function to the normalized repair code to obtain a hash value that corresponds to the normalized repair code; and
   using the hash value as the repair code pattern.

* * * * *